Feb. 11, 1969  J. A. FOX  3,426,663
INTRA-TUBULAR CAMERAS
Filed March 8, 1966  Sheet 2 of 3

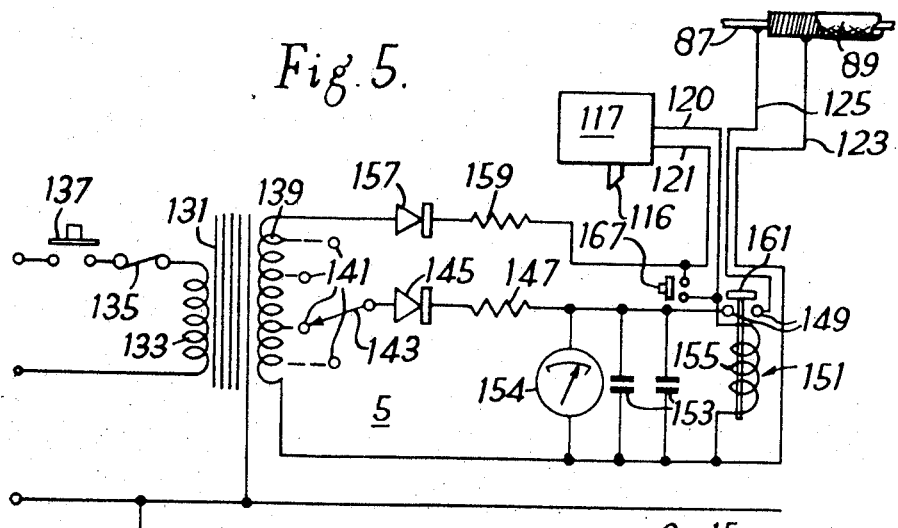
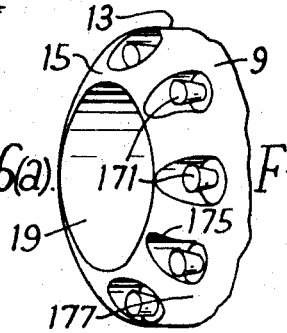
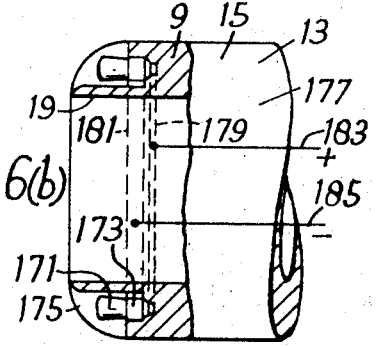
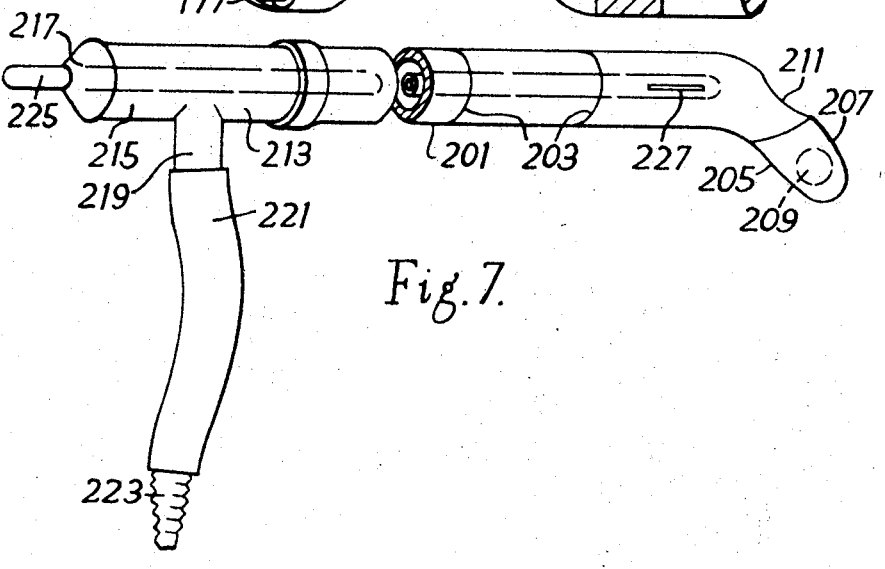

United States Patent Office 3,426,663
Patented Feb. 11, 1969

3,426,663
INTRA-TUBULAR CAMERAS
John A. Fox, London, England, assignor to National Research Development Corporation, London, England, a corporation of Great Britain
Filed Mar. 8, 1966, Ser. No. 532,693
Claims priority, application Great Britain, Mar. 15, 1965, 10,927/65
U.S. Cl. 95—11                  10 Claims
Int. Cl. G03b *19/00;* A61b *1/06*

ABSTRACT OF THE DISCLOSURE

A camera for intra-tubular photography having an elongated body, a forwardly directed lens mounted on the forward end of the body, a lens aperture disposed rearwardly of the lens and a device for directing illumination forwardly in order to expose film. An open ended tubular guide is provided on the body so that it can be threaded on a guide rod disposed in the tube to be photographed to facilitate movement of the body relative to the guide rod along the tube being photographed.

---

This invention relates to intra-tubular cameras, that is to say cameras for photographing the interior of a tube. More particularly the invention is concerned with intra-tubular cameras for photographing the interior of small diameter tubes, for example, the large intestine of the human body.

The diagnosis of lesions in the large intestine is usually accomplished by means of barium enema studies with air contrast after evacuation. This technique has certain limitations such as in the diagnosis of isolated polyps or in the differentiating from one another of obstructive masses due to diverticulitis or carcinoma. If these lesions are within 30 cm. from the anus the diagnosis is easily confirmed by use of the sigmoidoscope. Beyond 30 cm. from the anus, however, is a colonic tube which is some 90 cm. long and which cannot be directly viewed.

For several years there has existed a camera for viewing the interior of the stomach, the camera being introduced into the stomach by way of the oesophagus. This camera includes a body part having a laterally facing lens and remotely actuable means for rotating the body part about its axis and a further axis normal thereto. By appropriate operation of these remotely actuable means the attitude of the camera can be adjusted to enable any desired section of the stomach side wall to be photographed.

Whilst this known camera produces very good results in gastro-photography, it is not suited to intra-colonic photography. Perhaps the chief reason for this is that the laterally directed lens which has a viewing angle of about 80° requires that five separate exposures be taken at any given location in the colon in order to photograph the whole interior cylindrical surface. It is, accordingly, one object of the present invention to provide a simple and effective camera for intra-tubular photography, and which in one form is suitable particularly for intra-colonic photography.

According to the present invention of a camera for intra-tubular photography comprises an elongated body, a forwardly directed lens mounted at a forward end of the body, a lens aperture disposed within the body rearwardly of the lens, means inside the body defining a film path and including a film gate rearwardly of the lens aperture, forwardly directed illumination means associated with the body, remotely operable means for driving the film along the film path between exposures and for effecting illumination of the illumination means thereby to expose film in the camera, and an open-ended tubular guide provided on the body by means of which the body can be threaded on a guide rod disposed in a tube to be photographed, means being provided to enable the body to be moved relative to the guide rod along the tube.

Suitably, the body is formed with an open-ended tubular guide by means fo which the body can be threaded on a guide rod disposed in a tube to be photographed, means being provided to move the body relative to the guide rod along said tube to be photographed.

Preferably, the open-ended tubular guide is a bore formed in the body parallel with the axis thereof.

Advantageously, the means for moving the body relative to the guide rod comprise a hollow tube which extends rearwardly from the body and is of small bore and extends around the guide rod.

In one form of the invention the illumination means comprise lamp means mounted in the rear of the body and the body itself the latter being adapted to convey light forwardly by internal reflection thereby to provide forwardly directed light upon operation of the lamp means.

In another form of the invention the illumination means comprise a ring of lamps mounted on the forward end of the body and adapted to provide, upon operation thereof forwardly directed light.

The invention will now be described by way of example, with reference to the accompanying somewhat diagrammatic drawings, in which:

FIGURE 5 is an electrical circuit diagram illustrating the control circuit of the camera;

Figure 1:
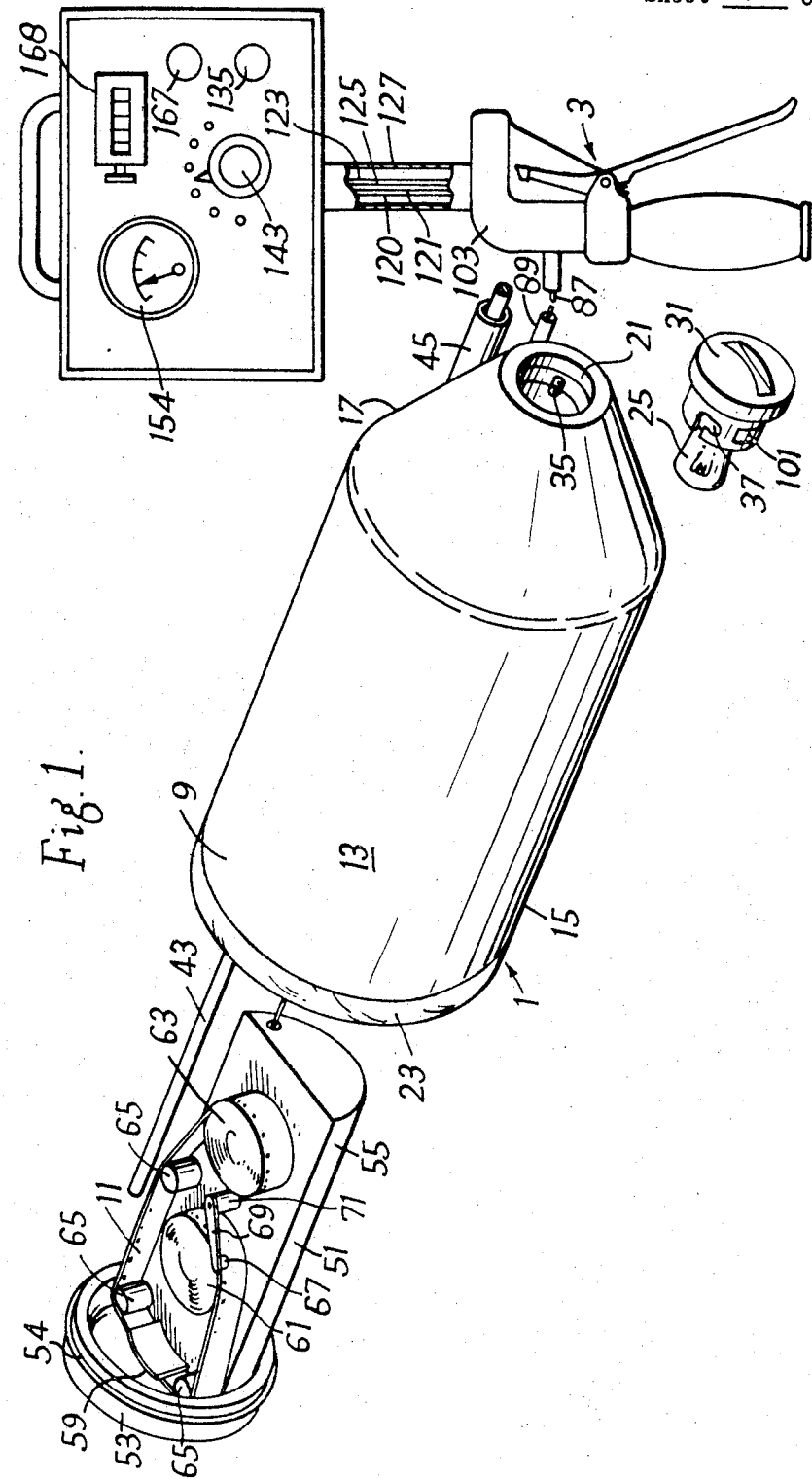
FIGURE 1 is a schematic view of a camera, according to this invention, for intra-colonic use together with its associated control box and trigger mechanism, the camera being shown in an exploded perspective view and on an enlarged scale.
Figure 2:
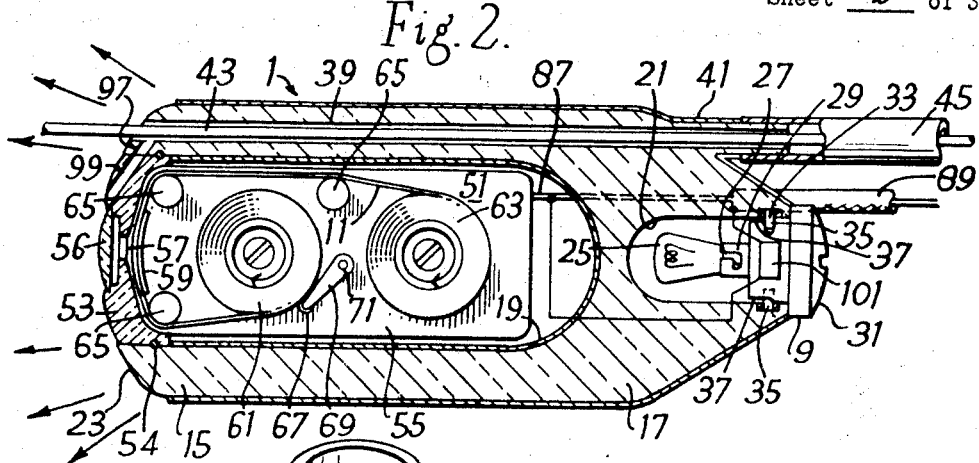
FIGURE 2 is an axial sectional view of the camera of FIGURE 1.

FIGURES 6(*a*) and 6(*b*) illustrate in fragmentary side and sectional side elevation views a modification of the camera shown in the previous figures; and FIGURE 7 illustrates the means of introducing the camera into the colon.

Throughout the drawings like parts have been accorded the same references.

Referring first to FIGURES 1 to 5, the camera for intracolonic photography therein illustrated is generally designated 1 and is operated by trigger mechanism 3 which causes an electrical circuit 5 in a control box 7 to effect operation of illumination means generally designated 9 whereby exposure of film 11 in the camera takes place. The camera comprises an elongated body part 13 of transparent material and of about 2 cm. diameter and 7 cm. length having a forward portion 15 the external shape of which is substantially cylindrical and a rear portion 17 which tapers rearwardly. The forward portion 15 of the body part is formed with an axially extending passage 19 which is open at its forward end and closed at its rear end whilst the rear portion 17 of the body part is also formed with an axially extending passage 21 open at its rear end and closed at its forward end. The passage 21 is shorter and of smaller diameter than the passage 19.

The external surface of the body part 13 except for a forward end surface 23 thereof and the internal surface of the passage 19 are aluminised or silvered so that light emitted from a filament lamp 25 in the passage 21 is directed by total internal reflection along the body part 13 and forwardly therefrom through the surface 23. The lamp 25 fits by means of a bayonet connection 27, into a socket 29 carried on a base 31 which itself engages in the end of the passage 21 by means of a bayonet connection 33 comprising pins 35 on the body part 13 and bayonet grooves 37 on the base 31.

Extending parallel with the axis thereof there is formed in the body part a bore 39 which terminates at its rear end in a hollow spigot 41 integral with the body part 13. The bore 39 and spigot constitute an open-ended tubular guide within which is threaded a flexible guide rod 43 the camera being advanced or retracted along the intestinal passage of a patient by means of forward or rearward movement relative to the rod 43 of a nylon tube 45 secured at its forward end to the spigot 41 and within which the guide rod 43 extends.

In the passage 19 is disposed a member 51 comprising a forward lens mounting portion 53 and a rearward, hollow semi-cylindrical portion 55. The member 51 engages in the body part 13 by a push fit and is held in position and in fluid-tight fashion by means of an O-ring seal 54 carried on the exterior surface of the lens mounting portion 53. The lens mounting portion carries a planoconvex lens 56 having a field of view which subtends an angle of 60 to 70 degrees at the lens. Immediately to the rear of the lens 56 the mounting portion 53 is formed with an iris or lens aperture 57. The rear surface of the lens mounting portion 53 adjacent the iris 57 and a guide plate 59 carried on the rearward portion 55 of the member 51 together constitute a film gate between which the film 11 extends in its path from a feed spool 61 to a take-up spool 63 by way of guide pins 65, the spools 61 and 63 being supported on the flat upper surface of the semi-cylindrical portion 55. The film on the feed spool 61 is engaged by a friction hold-back roller 67 carried on an arm 69 which is rotatably mounted on a post 71 carried on the flat upper surface of the portion 55, the arm 69 being biased by a spring not shown) towards the feed spool 61.

Figure 3:
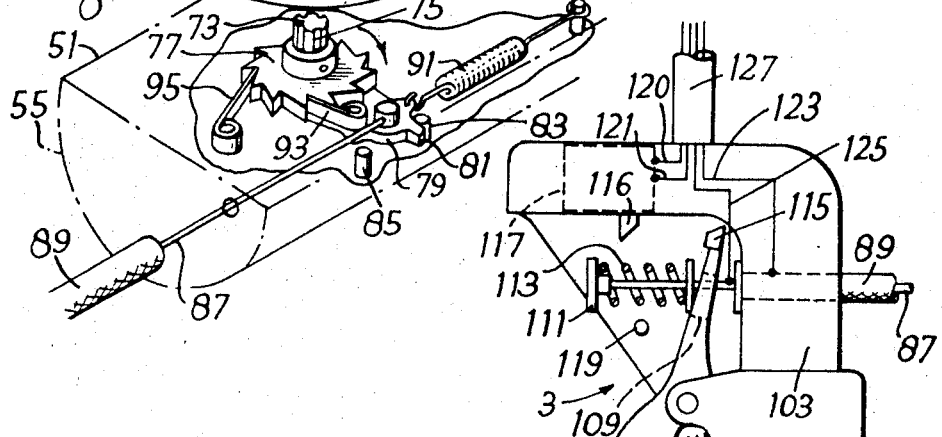
FIGURE 3 is a view of the film drive mechanism of the camera.
Figure 4:
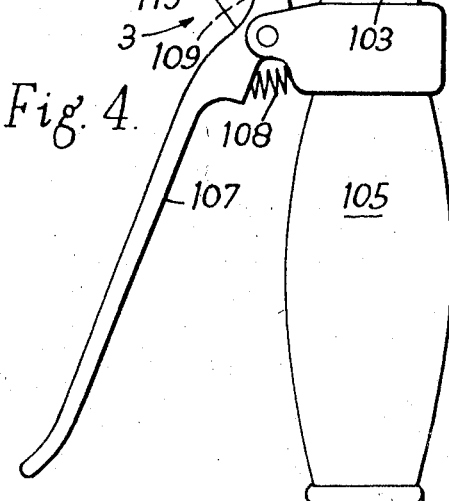
FIGURE 4 is a side elevation of the camera trigger mechanism.

The drive to the take-up spool 63 is shown in FIGURE 3 from which it will be seen that the take-up spool is removably carried on a splined end 73 of a spindle 75 to which is fixedly secured a ratchet wheel 77. On the spindle 75 below the ratchet wheel 77 is pivotally secured an arm 79 an outer end part 81 of which is movable from a stop 83 to a stop 85 by means of the inner wire 87 of a Bowden cable having a sheath 89. A helical return spring 91 keeps the arm 79 engaged with the stop 83 when there is no tension applied to the Bowden cable wire 87. The arm 79 carries a flexible drive pawl 93 which engages the ratchet wheel 77 and drives that wheel during part of the movement of the arm 79 from the stop 83 to the stop 85. A further pawl 95 is provided which is mounted in the hollow portion 55 and engages the ratchet wheel 77. This pawl during the driving stroke of the arm 79 passes from one to the following tooth of the wheel 77 just before the pawl 93 moves to the following tooth from the tooth with which, at the beginning of the driving stroke of the arm 79, it was engaged. During the return stroke of the arm 79 the pawl 95 prevents reverse rotation of the ratchet wheel 77.

The Bowden cable extends rearwardly from the body part 13 of the camera, an end of the sheath 89 being anchored in the body part 13.

It will be noted that the body part 13 and the lens mounting portion 53 are formed with collinear passages 97 and 99 which at their ends remote from the aligned ends thereof terminate respectively in the bore 39 and adjacent the lens 56. As will hereinafter be more fully described the bore 39 and passages 97 and 99 enable water to be directed towards the lens 56 for cleaning thereof.

The inner wire 87 and sheath 89 of the Bowden cable are each electrically conductive and covered with a layer of insulating material. The cable is used to conduct electrical current to the lamp 25 for illumination thereby. To this end the wire 87 and sheath 89 are connected to respective conductive strips, such as strip 101, at diametrically opposite sides of the lamp base 31, these conductive strips being in turn connected with individual terminals in the socket 29 which connect electrically with opposite ends of the lamp filament.

At the end of the Bowden cable remote from the camera is the trigger mechanism 3 in a housing part 103 of which is anchored the end of the cable sheath 89. The housing part 103 is formed with a handgrip 105 on which is pivotally mounted a lever 107 biased by a spring 108 away from the handgrip. On the side of the lever 107 remote from the pivotal mounting thereof, the lever is formed with a longitudinally extending slot 109 through which the cable wire 87 extends. On the side of the lever 107 remote from the end of the cable sheath 89 the cable wire 87 terminates in an abutment 111 between which the lever 107 is provided with a helical compression spring 113 having greater stiffness than the return spring 91. At its end remote from the pivotal mounting thereof the slotted part of the lever 107 carries a part 115 which, when the lever is pivotally moved against the action of the spring 108, engages and depresses an actuating element 116 of a microswitch 117 to close contacts in that switch. A stop 119 on the housing part 103 limits movement of the lever 107 and ensures that at the limiting position of the lever 107 the part 115 and the element 116 are still in contact. It will be apparent that by virtue of the comparative stiffness of the springs 113 and 91, when the lever 107 is squeezed towards the handgrip 105 the spring 113 moves the wire 87 out of the cable sheath thus driving the film 11. When the arm 79 engages stop 85 continued movement of the lever 107 effects compression of the spring 113 during which engagement of the part 115 and the microswitch actuating element 116 takes place. It will be observed that leads 120 and 121 of the microswitch and leads 123 and 125 from the wire and sheath of the Bowden cable are taken in a single cable 127 to the control box 7. In the control box is disposed the circuit shown in FIGURE 5 which includes a screened or mains isolated step-down transformer 131 having a primary winding 133 connected by way of a fuse 135 and switch means 137 to the alternating current main supply. One end, namely the negative end, of the secondary winding 139 of the transformer is connected to the Bowden cable sheath 89 whilst any one of the tappings 141 of the secondary winding can be connected by way of a contact arm 143, rectifier 145, resistor 147 and contacts 149 of a relay 151 with the Bowden cable wire 87. Connected between the wire 87 and sheath 89, that is to say in parallel with the lamp 25 are capacitors 153 in parallel with which is a coulomb meter 154. A coil 155 of the relay 151 which has a spring biased armature 161 is connected in series with a rectifier 157, resistor 159 and the microswitch 117 across the full secondary winding 139 of the transformer.

In operation of the electrical circuit the capacitors 153 are charged through the rectifier 145 and resistor 147 and the level of charge is indicated on the meter 154. When the microswitch 117 is actuated by the part 115 of the trigger mechanism the coil 155 is energized and the armature 161 of the relay closes the contacts 149 so that the capacitors discharge through the lamp 25 and illuminate the latter to an intensity which depends on the tapping 141 of the secondary winding of the transformer engaged by the contact arm 143, the proportion of the secondary winding in parallel with the capacitor controlling the level of electrical charge attainable on the capacitors. The control box 7 is provided with a manually resettable counter 168 which can be suitably mechanically linked to the Bowden cable or electrically linked to the microswitch 117 to record the number of times the lamp 25 is illuminated. A push button 167 on the control box can be actuated to short circuit the switch 117 and illuminate the lamp 25 without effecting drive of the film 11. Operation of the push button 167 does not effect operation of the counter 168.

Referring now to FIGURES 6(a) and 6(b), instead of the lamp 25 and light guide formed by the body part 13 of the camera, the illumination means of the camera comprise a ring of lamps 171 mounted in individual sockets 173 supported in respective recesses 175 on a body part 177 of the camera. The body part 177 is, apart from the recesses 175, of the same shape as the body part 13 and is formed from metal in which are supported insulated annular contacts 179 and 181 which connect with each of the sockets 173 and a terminal of each lamp 171. The contacts 179 and 181 connect by way of leads 183 and 185 with the wire and sheath of the Bowden cable 89.

In FIGURE 7 there is illustrated the apparatus whereby the guide rod 43 is introduced into the colon. A hollow flexible tubular member 201 is provided which is about 150 cm. long and has graduations 203 along its length at 10 cm. intervals. At its forward end the member 201 is formed with an inclined part 205 in a forward tip 207 of which is embedded a radio opaque element in the form of a metal ball 209. In a front surface of the inclined part 205 is an aperture 211. At the rear end of the member 201 is fitted a hollow T-piece 213 having a cross-member 215 arranged in line with the member 201. The end of the cross-member 215 remote from member 201 is provided with an end sealing nipple 217. The leg 219 of the T-piece is connected to a flexible tube 221 an end part 223 of which is connected to a hand operated bellows pump whereby air can be passed to and through the forward end of the member 201.

Before introducing the member 201 into the colon there is passed into that member a hollow rod element 225 having a radio opaque tip 227. The hollow rod element is made from plastics material, has silicone applied to its exterior surface and is less flexible than the guide rod 43. When located in the member 201 the hollow rod element 225 engages the end sealing nipple 217.

The tip 227 is disposed a few centimeters to the rear of the aperture 211 and the interior surface of the member 201 has silicone applied thereto whereupon the member 201 and element 225 are introduced into the colon, X-ray screening being employed to determine the position reached in the colon of the member 201 and element 225. As the member 201 and element 225 are passed along the colon air is also introduced through the aperture 211 by operation of the bellows pump, the introduction of air in this manner facilitating passing of the member 201 and element 225. During introduction of the member 201, the element 225 can be moved relative thereto so as to stiffen or render more flexible as desired the forward end of the member 201.

When the tubular member 201 end rod element 225 are positioned as required in the colon, the element 225 is withdrawn and the more flexible guide rod 43, which is graduated at suitable intervals and has silicone applied to its surface, is passed along the tubular element 201. When the forward tip of the rod 43 is located close behind the aperture 211, the member 201 is withdrawn over the guide rod 43 leaving the latter in position in the colon. The camera is then threaded along the guide rod and advanced by appropriate movement of the tube 45 relative to the guide rod 43. When the camera is disposed adjacent the tip of the rod 43 at the most forward location in the colon where it is desired to take photographs water is introduced into the tube 45 by way of a T-piece not shown) which is similar to the T-piece 213 and which is connected to the rear end of the tube 45. The lens 56 is thus first cleaned after which air is introduced through the tube 45 to inflate the colon whereupon the required number of photographs are taken. The camera is then retracted by the tube 45 together with the rod 43 to a further photographing location spaced some 10 cm. approximately from the first location where photographs were taken. The lens cleaning and colon inflating procedures are then again carried out prior to taking photographs. The sequence of operations is then repeated until a required length of the colon has been photographed.

It will be apparent that the tube 201 has application beyond that of introducing the guide rod 43 into the colon. Thus, for example it may be used for taking samples of tissue from the interior of the colon and in this application a multipurpose suction biopsy apparatus suitably of the known Quinton form is passed through the tube 201 to project from the aperture 211 and remove tissue from the colon immediately in advance of the aperture 211.

Whilst the camera described is utilized for intracolonic photography, it will be apparent that it is applicable more generally to intra-tubular photography.

I claim:

1. A camera for intra-tubular photography comprising an elongated body, a forwardly directed lens mounted at a forward end of said body, a lens aperture disposed within said body rearwardly of said lens, means inside said body defining a film path and including a film gate rearwardly of said lens aperture, forwardly directed illumination means associated with said body, remotely operable means for driving said film along said film path between exposures and for effecting illumination of said illumination means thereby to expose film in said camera, and an open-ended tubular guide provided on said body by means of which said body can be threaded on a guide rod disposed in a tube to be photographed, means being provided to enable said body to be moved relative to said guide rod along said tube to be photographed.

2. A camera as claimed in claim 1, wherein the open-ended tubuar guide is a bore formed in the body parallel with the axis thereof.

3. A camera as claimed in claim 2, wherein the means for moving the body relative to the guide rod comprise a hollow tube which extends rearwardly from the body and is of small bore and extends around the guide rod.

4. A camera as claimed in claim 3, wherein near the forward end of the bore in the camera body there are provided lateral passage means connected with the bore which open near the camera lens so that liquid can be supplied by way of the bore and passage means to effect cleaning of the lens.

5. A camera as claimed in claim 1, wherein the illumination means comprise lamp means mounted in the rear of the body and the body itself, the latter being adapted to convey light forwardly by internal reflection thereby to provide forwardly directed light upon operation of the lamp means.

6. A camera as claimed in claim 5, wherein the elongated body of the camera is formed from transparent material and includes a forward part having an axial bore open at its forward end and closed at its rearward end within which a lens mounting and means providing the film guide path are supported, the external surface of the body and the internal surface of the bore being treated to reflect light internally so that light from the lamp means is conveyed forwardly through the body of the camera.

7. A camera as claimed in claim 6, wherein the body has a rear part formed with an axial bore open at its rear end and closed at its forward end within which bore the lamp means is mounted.

8. A camera as claimed in claim 7, wherein rearwardly of the lens mounting and formed in one therewith is a mounting for a film supply spool and a film take-up spool, the film path extending from the supply to the take-up spool by way of guide members and the film gate, there being further provided film drive means for driving the take-up spool and which are actuated remotely by Bowden cable means.

9. A camera as claimed in claim 1, wherein the illumination means comprise a ring of lamps mounted on the forward end of the body and adapted to provide, upon operation thereof, forwardly directed light.

10. A camera as claimed in claim 9, wherein rearwardly of the lens mounting and formed in one therewith is a mounting for a film supply spool and a film take-up spool, the film path extending from the supply to the take-up spool by way of guide members and the film gate, there being further provided film drive means for driving the take-up spool and which are actuated remotely by Bowden cable means.

References Cited

UNITED STATES PATENTS

| | | | |
|---|---|---|---|
| 2,161,380 | 6/1939 | Opocensky | 95—11 |
| 2,708,437 | 5/1955 | Hutchins | 128—7 |
| 3,086,525 | 4/1963 | Whitcomb | 128—348 XR |
| 3,244,085 | 4/1966 | Pulfer | 95—11 |
| 3,279,085 | 10/1966 | Reinhart | 95—11 |
| 3,329,074 | 7/1967 | Gosselin | 95—11 |

NORTON ANSHER, *Primary Examiner.*

FRED. L. BRAUN, *Assistant Examiner.*